(Model.)
J. I. FOOT.
BEE HIVE.
No. 398,387. Patented Feb. 26, 1889.
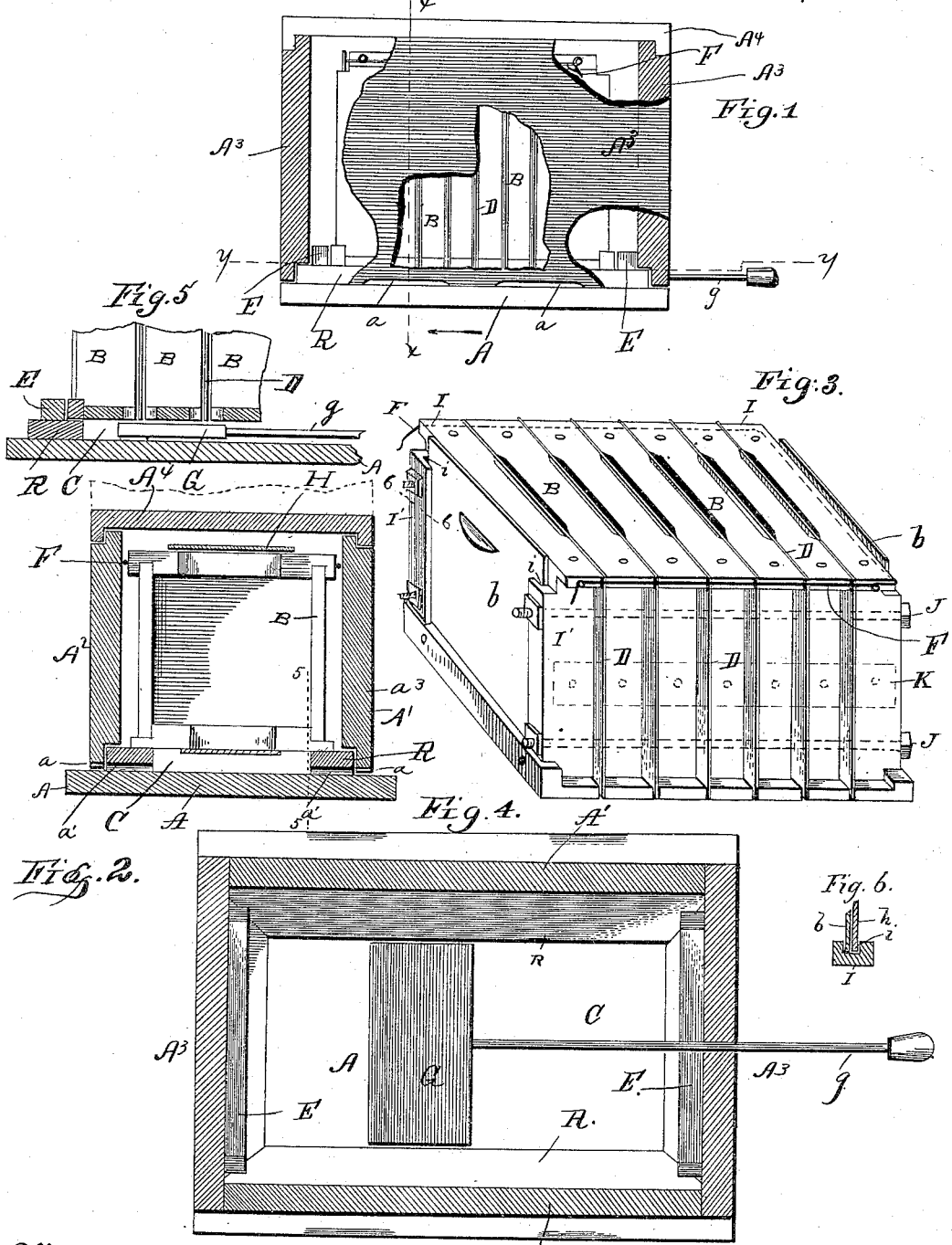
Witnesses
R. C. Laurie
S. Specht
Inventor
Joseph I. Foot
By his Attorneys
R. S. & A. P. Lacey

UNITED STATES PATENT OFFICE.

JOSEPH I. FOOT, OF SAN DIEGO, CALIFORNIA.

BEE-HIVE.

SPECIFICATION forming part of Letters Patent No. 398,387, dated February 26, 1889.

Application filed April 13, 1887. Serial No. 234,682. (Model.)

*To all whom it may concern:*

Be it known that I, JOSEPH I. FOOT, a citizen of the United States, residing at San Diego, in the county of San Diego and State of California, have invented certain new and useful Improvements in Bee-Hives; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to bee-hives of that class which have a series of independent frames located within a casing or chamber.

The improvement consists in the novel features of construction which hereinafter will be more fully described, claimed, and shown in the annexed drawings, in which—

Figure 1 is a side elevation, parts being broken away, of a brood-chamber embodying my invention; Fig. 2, a cross-section on the line $x\ x$ of Fig. 1, looking to the left; Fig. 3, a perspective view of the brood-frames removed from the brood-chamber or casing; Fig. 4, a horizontal section on the lower portion of the brood-chamber and the brood-frames on the line $y\ y$ of Fig. 1, on an enlarged scale; Fig. 5, a detail vertical section of one end of the brood-chamber about on the line 5 5 of Fig. 2, and Fig. 6 a detail section of one side of the end frames on the line 6 6 of Fig. 3.

The invention consists in the brood-chamber made in sections, the top, bottom, and sides of which are jointed in such a manner as to exclude moths and vermin of all kinds, yet readily removable for all purposes of hiving, handling, or transporting the bees, and in having a series of frames which can be separated from one another, and which can have a desired number shut off from the others by a slide or equivalent means.

The casing or chamber is composed of the bottom A, the rear and front sides, A' A², the two ends A³, the top A⁴, and the frames B. The bottom is provided with the rim R, which is secured thereto at a short distance from its edges and prevents the bottom from warping and splitting and renders the ordinary cleats unnecessary. This rim, besides strengthening the bottom and forming the rest or support for the frames, affords a joint of several angles and surfaces, which effectually excludes moths and vermin from the interior of the case or brood-chamber.

The body of the case, composed of the sides A' A² and the ends A³, is rabbeted on its lower edge, so that a portion extends over or overlaps the top of the rim and a portion extends down around the rim and rests upon the bottom, thereby forming a close joint, which will prevent the entrance of vermin. The lower edges of the sides A' and A² are notched to provide openings $a$ for the ingress and egress of the bees. The rim is provided with corresponding openings, $a'$, opposite the openings $a$, for a like purpose—namely, a thoroughfare for the bees in their going in and coming out of the brood-chamber.

The frames are of ordinary shape and pattern and rest upon the rim R, so as to leave a space, C, the thickness of the rim between them and the bottom A. A dead-air space is formed between the sides and the ends of the case and the frames, which may be filled with chaff, cut straw, or other packing material, to preserve a somewhat uniform temperature. The frames are placed beside one another and have openings formed at the top and bottom between each two upper and lower bars of the frames to permit the passage of the bees. Thin plates D are interposed between the frames for separating the combs and dividing the colony. These plates can be inserted between the frames without disturbing the bees or allowing them to escape. The sides I of the end frames, I', of the series of frames are extended and provided with grooves $i$ for the reception of the slides $b$, which close the end frames of the series of brood-frames. The slides $b$ can be raised at will for hiving the swarm or for viewing the work of the bees. Glass, as $h$, may be inserted between these slides and the bees in the same grooves with the slides $b$, as shown most clearly in Fig. 6, so that the work can be viewed from time to time by raising the said slides. In practice the series of brood-frames are placed upon the rim, and are held from separating at their lower ends by the cleats E, which are secured to the rim R on each end of the bottom board, and at their tops by the wires F, which extend along the edges of the brood-frames, and which are fastened at their ends to the end frames of the series of brood-frames.

Instead of wires F, bolts J or a thin strip, K, may be provided to hold the frames together, as shown by dotted lines in Fig. 3.

The slide or cut-off G, located in the space C, can be moved to any desired point for shutting the bees off from a portion of the frames in case the swarm is small, or if it is desired to remove a portion or some of the frames for any purpose whatsoever. The rod $g$, connected at one end with the slide and passing through and out beyond the rim R, is provided to be grasped by the hand in order to move the slide. The brood-frames are provided with a supplemental cover, H, to close the openings between their upper bars when the top $A^4$ of the hive or case is removed, and a similar slide will be provided to close the openings between the lower bars when the frames are wholly removed from the case or brood-chamber for transportation or for any other purpose.

The frames will be held together during transportation by any suitable means—as by the bolts J, which pass through the sides of the series of frames, or by the strips K, which are fastened to each frame of the series, as will be readily understood.

The brooder may be provided with a honey-section or not, as desired. If a honey-section is provided, it may be applied to the brooder in the most convenient manner, the dotted lines in Fig. 2 showing the lower portion of a honey-section applied to the top of the brooder.

Having thus described my invention, what I claim, and desire to secure by Letters Patent, is—

1. The combination, with the bottom and the rim having bee-entrances, of the frames mounted upon the rim and having a space between them and the bottom, and having bee-entrances between their bottom bars, and the cut-off slide fitted against the bottom bars of the frames and located in said space and adapted to be moved therein to cut off any required number of the frames, substantially as and for the purpose described.

2. The combination, with the series of comb-frames the end ones of which have their sides extended and vertically grooved, of the slides $b$ and glass $h$, fitted in the said grooves, and means, as described, for securing the said frames together, substantially as set forth.

3. The herein shown and described beehive, composed of the bottom, the rim secured thereto, the brood-frames placed upon the rim, cleats fastened to the ends of the rim and embracing the lower edges of the frames, the wire holding the upper edges of the frames from spreading, the slides at each end of the series of brood-frames, and thin plates interposed between the brood-frames, the cut-off slide, the case rabbeted on its lower edge and fitted to the rim, and the supplemental top and the top proper, substantially as and for the purpose set forth.

In testimony whereof I affix my signature in presence of two witnesses.

JOSEPH I. FOOT.

Witnesses:
FRANK J. HIGGINS,
WM. H. CARLSON.